United States Patent
Hinkle et al.

(10) Patent No.: US 7,272,817 B1
(45) Date of Patent: Sep. 18, 2007

(54) METHOD AND APPARATUS FOR MODELING A BUSINESS PROCESS TO FACILITATE EVALUATION OF DRIVING METRICS

(75) Inventors: Burl Shannon Hinkle, Charlotte, NC (US); Ramon Roque Balisnomo, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 602 days.

(21) Appl. No.: 10/825,533

(22) Filed: Apr. 15, 2004

(51) Int. Cl.
*G06F 9/45* (2006.01)
(52) U.S. Cl. .................. 717/104; 717/151; 703/27
(58) Field of Classification Search ............... 717/104, 717/151; 703/2, 27
See application file for complete search history.

(56) References Cited

U.S. PATENT DOCUMENTS

| | | | |
|---|---|---|---|
| 6,278,977 B1 | 8/2001 | Agrawal et al. | |
| 6,677,963 B1 * | 1/2004 | Mani et al. | 715/764 |
| 2002/0049573 A1 * | 4/2002 | El Ata | 703/2 |
| 2002/0049621 A1 * | 4/2002 | Bruce | 705/7 |
| 2002/0116245 A1 | 8/2002 | Hinkle et al. | |
| 2002/0184043 A1 * | 12/2002 | Lavorgna et al. | 705/1 |
| 2002/0188488 A1 | 12/2002 | Hinkle | |
| 2003/0093762 A1 | 5/2003 | Rletman et al. | |
| 2005/0027577 A1 * | 2/2005 | Saeed | 705/8 |

* cited by examiner

*Primary Examiner*—John Chavis
(74) *Attorney, Agent, or Firm*—Moore & Van Allen PLLC; Steven B. Phillips (57) ABSTRACT

Method and apparatus for modeling a business process to facilitate evaluation of driving metrics. A decision tool can be provided to help manage a business process. Model files are created based on data pertaining to a plurality interrelated metrics. Each of the plurality of model files is optimized. The results of the optimization for the various metrics can be combined into a summary, which describes a hierarchy of selected driving metrics in such a way as to facilitate an understanding how to fine-tune various metrics to meet goals. An embodiment of the invention can take the form of a stand-alone computing system running a spreadsheet program, a stand-alone computer system running a dedicated application, or a computer system interconnected with a data warehouse to acquire current data regarding the interrelated metrics.

27 Claims, 10 Drawing Sheets

Step 1:
Setup the parameters of the analysis

| Metric | Exclude? | Controll-able? | Create Lag Affects? | Lag Period (1-30) | Average Value |
|---|---|---|---|---|---|
| FirstCallResoution | No | Yes | Yes | 4 | 0.86 |
| AuthResolve | No | Yes | Yes | 4 | 0.81 |
| Completeness | No | Yes | Yes | 4 | 0.85 |
| CustDelight | No | Yes | Yes | 4 | 0.52 |
| NumInq | No | No | Yes | 4 | 1371796.50 |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |
|  | No | Yes | Yes | 4 |  |

| -Sigma | +Sigma |
|---|---|
| 3 | 3 |

| Setup | | Results |
|---|---|---|
| Lower Tolerance | Upper Tolerance | Target Value |
| 0.82 | 0.90 | |
| 0.78 | 0.83 | |
| 0.83 | 0.87 | |
| 0.48 | 0.56 | 0.62 |
| 1007788.65 | 1735803.44 | |

Step 2:

Which metric would you like to improve (maximize or Minimize)?

| CustDelight ▽ |
|---|

Note: You cannot have more variables than data points, and remember that the time to run is exponential to the number of Total Variables:

Step 3: Click the following Command Button:

| Run Analysis |
|---|

Options:

Max P-Value for Metric Elimination: | 0.30 |

Starting r-Value for Metric Elimination: | 0.3 |

Max X's For Any Y: | 10 |

Number Period for "Current" Performance: | 4 |

METHOD AND APPARATUS FOR MODELING A BUSINESS PROCESS TO FACILITATE EVALUATION OF DRIVING METRICS

CROSS-REFERENCE TO COMPUTER PROGRAM LISTING APPENDIX

A portion of the present disclosure is contained in a compact disc, computer program listing appendix. The compact disc contains an MS-DOS text file named B-Engine.txt created on Mar. 25, 2004, of approximately 83 kilobytes. The contents of this file are incorporated herein by reference. Any references to "the appendix" or the like in this specification refer to the file contained on the compact disc.

The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

BACKGROUND OF INVENTION

Understanding how to execute a business process within a company or enterprise in order to maximize revenue, profit, or other metrics, is of enormous importance and has a significant impact on the company's success in the marketplace. Ideally therefore, business processes should be monitored, modeled, and optimized in much the same ways as scientific or manufacturing processes. In particular, it is important to know how various activities within the business process drive various metrics. Thus, it can be understood how to adjust various subprocesses and their drivers in order to achieve appropriate performance relative to one or more overriding goals.

Despite the above described need, it is often difficult to model and describe the activities and metrics that are part of a business process in a way that accurately reflects their relationships to each other and their effects on one another. Very often, the various activities included in a business process are developed independently and no one person has the comprehensive knowledge necessary to accurately determine how one metric affects another. Often, data which attempts to characterize these relationships is centered around separate systems and lacks currency. In other cases, more comprehensive modeling and evaluation can be accomplished, but only with extensive, laborious, calculations performed over an extended period of time.

SUMMARY OF INVENTION

The present invention, as illustrated by example embodiments, can provide a decision tool that helps manage the complexities of a business process in order to maximize or improve a goal metric. In many cases, the goal metric might be profitability, customer satisfaction, income, or other metrics, which tend to be of overriding importance to a business. However, the techniques disclosed can be used to maximize or optimize any metric. A model or models, which can be created through use of embodiments of the invention, can be used to find optimal values for selected driving metrics for a goal metric. Such driving metrics can include, for example, such things as staffing levels, processing times, shrinkage, and other performance metrics in regard to providing goods or services. The modeling techniques of the invention can be used to provide more definitive, accurate, and timely information on how to optimize business performance in any organization or enterprise.

In example embodiments of the invention, a business process can be modeled to facilitate an evaluation of driving metrics which drive or can drive a selected goal metric. The modeling begins by gathering data to define a plurality of interrelated metrics associated with the business process. The data can include parameters for controlling the manner in which the metrics are modeled and reflected in the analysis. The data can also include a listing of all the interrelated metrics and their known or average values. In some embodiments, the later can be gathered via connections to data stores or a data warehouse. A plurality of model files based on the data is created, at least in part through regression analysis and nonlinear optimization. Each of the model files corresponds to one of the interrelated metrics. In example embodiments, each model is optimized to set coefficients and exponents to optimal values. The optimal values can be determined by minimizing the difference between an estimated value and a goal value for the selected goal metric. Finally, in example embodiments, the results of the optimization for the various metrics are combined into a summary which describes a hierarchy of selected driving metrics.

Parameters that can be input prior to performing an analysis can include a maximum number of driving metrics for each level. Other parameters can include a maximum value for the probability that a coefficient is zero, which can also be used to limit the number of metrics which are included in the summary. The controllability of a metric can also be indicated. Thus, a metric which is not easily controllable by the business can be included in a model using a constant value to represent the metric.

In example embodiments, the production of the summary report can include running a back substitution routine to further define the selected goal metric in terms of the smallest to the largest of the selected driving metrics. The back substitution routine can be followed by another nonlinear optimization to further define the selected goal metric in terms of the selected driving metrics. Additionally, time lag effects of various metrics can be taken into account in the summary based on time lag information input prior to an analysis being run.

In some embodiments, the invention is implemented via either a stand-alone computing platform or a computing platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data stores or a data warehouse can be connected to a computing platform that is performing the analysis. Dedicated software can be provided to implement the invention, or alternatively, a spreadsheet program with appropriate macros can be used to implement embodiments of the invention. In either case a user input screen is operable to receive appropriate input for controlling the manner in which the interrelated metrics are reflected in the summary, and a processing platform creates the models, performs nonlinear optimization, and combines the results in the appropriate manner.

BRIEF DESCRIPTION OF DRAWINGS

FIG. 2, shown as FIGS. 2A and 2B, is a flowchart which illustrates a method carried out by some example embodiments of the invention.

DETAILED DESCRIPTION

The present invention can most readily be understood by considering the detailed embodiments presented herein. Some of the embodiments are presented in the context of an enterprise using software to facilitate modeling and analysis in order to determine how to best optimize specific business metrics. However, these embodiments are examples only. It cannot be overemphasized that the invention has applicability to any type or size of organization and can be used to optimize any type of metrics.

The present invention can be embodied in computer software or a computer program product. An embodiment may include a spreadsheet program and appropriate macro programs, algorithms, or plug-ins. An embodiment may also consist of a custom-authored software application for any of various computing platforms. One specific example discussed herein involves the use of a Windows™ personal computing platform running Microsoft Excel™ spreadsheet software, with appropriate Visual Basic™ macros. It cannot be overemphasized that this embodiment is an example only. The source code for example Visual Basic macros, which enable the invention to be implemented in such an example embodiment is included in the appendix. The source code example will be readily understood by those of ordinary skill in the art. It will also be readily understood that the inventive concepts described herein can be adapted to any type of hardware and software platform using any operating system including those based on Unix™ and Linux. In any such embodiments, the instruction execution or computing platform in combination with computer program code instructions form the means to carry out the processes of the invention.

Some of the terminology used in this description should be understood from the beginning. The term "metric" and similar terms refer to measurable characteristics of a business process that can be expressed in numerical or mathematical terms. All of the metrics related to a particular business process may be referred to herein as "interrelated metrics" or the like. A "selected goal metric" or simply a "goal metric" is a metric from among the various interrelated metrics for a business process that a user of an embodiment of the invention is seeking to optimize. The models created with an embodiment of the invention can be used to determine which other metrics drive a selected goal metric. Such other metrics are referred to as "driving metrics" or the like. It should be noted that the selected goal metric is one of the interrelated metrics for a given business process model. As such, it is possible to run the same analysis repeatedly or concurrently with the same set of interrelated metrics and the same set of models but selecting a different metric as the goal metric for each analysis.

Terms such as "selected driving metric" and the like refer to the interrelated metrics that are reflected in a summary of an analysis. In some cases some interrelated metrics are eliminated during analysis. Thus, the selected driving metrics can be all of the interrelated goal metrics. However, as will become clear, example embodiments of the invention include mechanisms to eliminate certain interrelated metrics because their effect is minimal, or their presence would complicate an analysis. The term "coefficient" when used by itself is meant in the generic mathematical sense, that is, when equations are used to model a process, the coefficients are the numbers by which various metric values are multiplied in an equation. A "correlation coefficient" is also used in certain embodiments of the invention, and this term is meant in its statistical sense as distinct from the generic term "coefficient."

An understanding of the invention may be facilitated by an understanding of the way a business process can be modeled as a relationship where one metric is driven by other metrics, which are in turn driven by other metrics, etc. Thus, a selected goal metric is driven by a certain set of metrics. Each metric from that certain set of metrics is also driven in turn by other metrics. Such a relationship can be illustrated by a set of equations like that shown below. The selected goal metric is designated "Y" and might sometimes be referred to herein as the "big Y" metric. The big Y metric is a function of a plurality of driving metrics, designated in the first equation as x's. The second and third equations express how each of the x's that drive the big Y are in turn driven by other x's, and the equations can continue to cover the other x's in the first equation. Then, additional equations show that the x's from the second level of equations are in turn driven by still other x's, and so on.

$$Y = f(x_1 \cdots x_n)$$
$$x_1 = f(x_{11} \cdots x_{1n})$$
$$x_2 = f(x_{21} \cdots x_{2n})$$
$$\vdots$$
$$x_{11} = f(x_{111} \cdots x_{11n})$$
$$x_{12} = f(x_{121} \cdots x_{12n})$$
$$\vdots$$

The relationships expressed above can continue through as many orders as one would like, at least for complex business processes. As will be seen below, in example embodiments of the invention, mechanisms are in place to limit the number of selected driving metrics which are used to model a particular business process for analysis. However, the extent to which these metrics are limited can be determined by an individual user of the invention.

Embodiments of the invention can be used to model an infinite variety of business processes. For purposes of an illustrative example presented herein, it is assumed that the operating process of a customer call center is being analyzed. The analysis can help determine how to drive a particular goal metric by changing driving metrics such as the telephone call answer rate, how much authority to resolve a problem do the personnel manning the telephones have, amount of overtime worked, etc. The invention can be applied to any other business process. For example, an analysis could be done to determine how to maximize retail sales based on driving metrics such as the number of hours a store is open each day, the number of sales people available at any given time, etc. Similarly, a manufacturing process could be analyzed in terms of number of workers per shift, quantity of parts available, etc.

Figure 1:
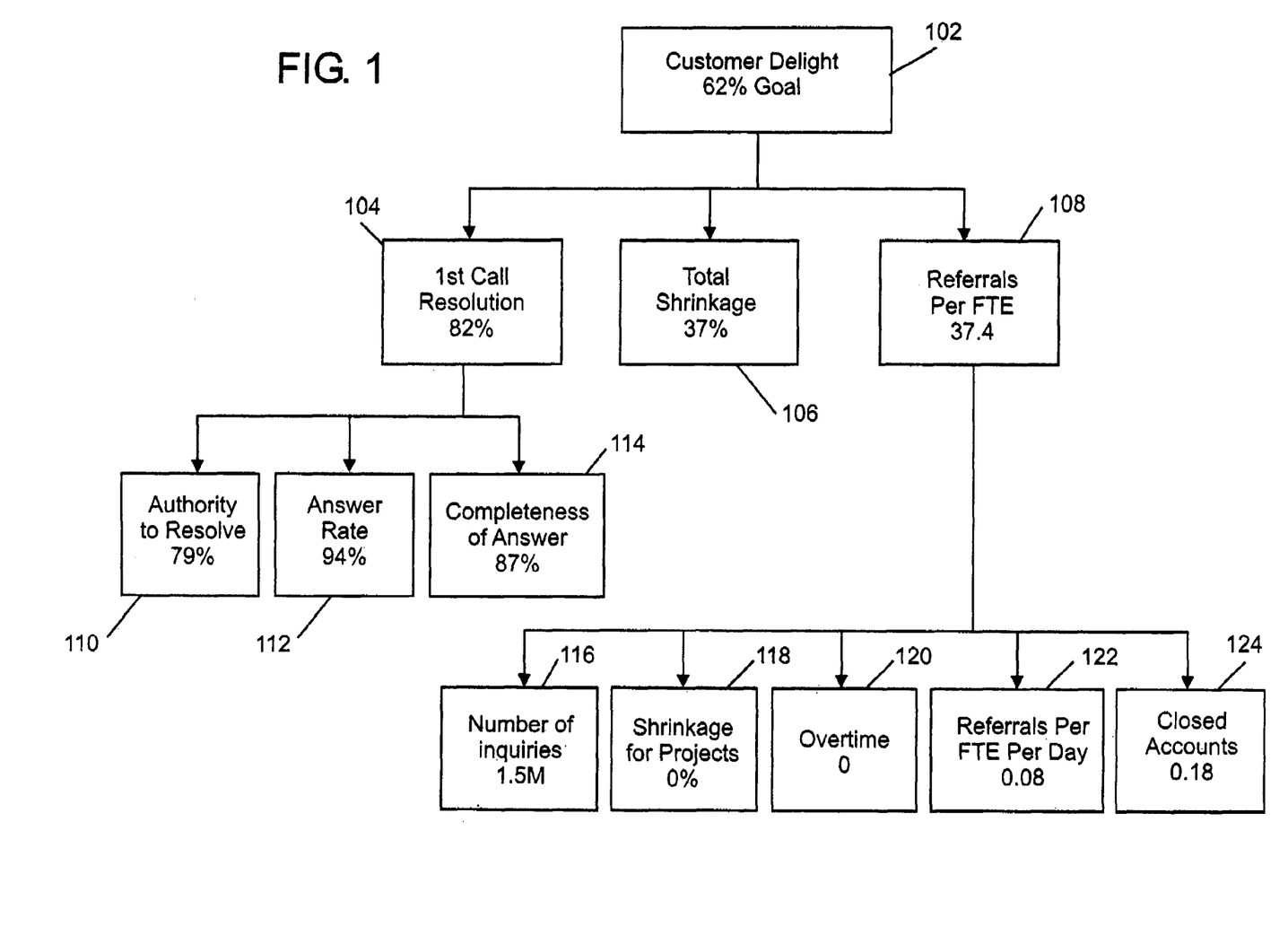
FIG. 1 is a block diagram that shows an example of how selected interrelated metrics can act as driving metrics for a goal metric.

FIG. 1 presents a block diagram that illustrates some of the relationships in graphical form for the example process for a customer call center. For purposes of this example, customer delight is the selected goal metric, as shown at 102. The optimal best value of the customer delight metric in this example is 62%. Driving metrics for customer delight include, first call resolution rate as shown at 104, optimal best 82%, total shrinkage as shown at 106, optimal best 37%, and referrals per fulltime employee, shown at 108, optimal best 37.4%. Two of the metrics which drive customer delight, namely first call resolution and referrals per fulltime employee, in turn have their own driving metrics. First call resolution 104 is driven in turn by the rate of problems which answering personnel have authority to resolve. This metric is shown at 110 and has an optimal best value of 79%. First call resolution is also driven by the answer rate, shown at 112, which has an optimal best value of 94%. Additionally, first call resolution is driven by a completeness of answer metric, shown at 114, with an optimal best value of 87%. Referrals per fulltime employee (FTE), 108, are driven by at least three other driving metrics. The number of inquiries received during a measurement period, 116, the amount of shrinkage for individual projects, 118, the amount of overtime during a measurement period, 120, the number of referrals per fulltime employee per day, 122, and the number of closed accounts per reporting period, 124, all drive the referrals per fulltime employee. The optimal best value for the number of inquiries per measuring period is 1.5 million. (Note this metric is marked as not "controllable" in the setup. This value is the same as the current actual.) Shrinkage for individual projects, and overtime both stand at optimal best of zero. Referrals per fulltime employee per day, 122, has an optimal best value of 0.08. The number of closed accounts per measurement cycle, 124, has an optimal best value of 0.18. The preceding example presents only a limited number of selected driving metrics for the selected goal metric of customer delight. The number has been limited in order to maintain clarity of the example. The invention can be employed with processes with this number or even fewer metrics. However, as can be readily appreciated by one of skill in the art, the invention can also be applied to processes with many layers of driving metrics.

Figures 2, 2B:
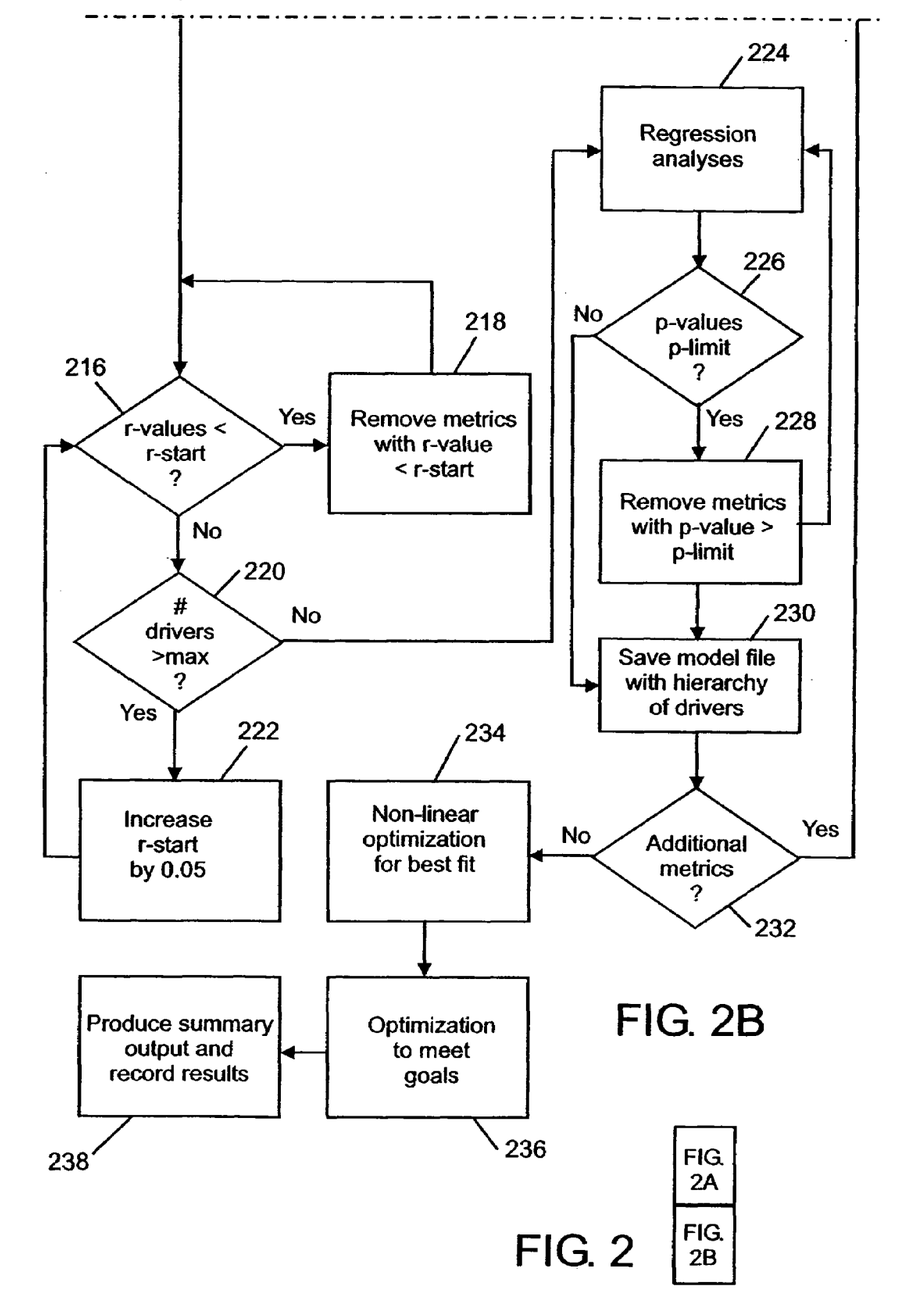
Figure 2A:
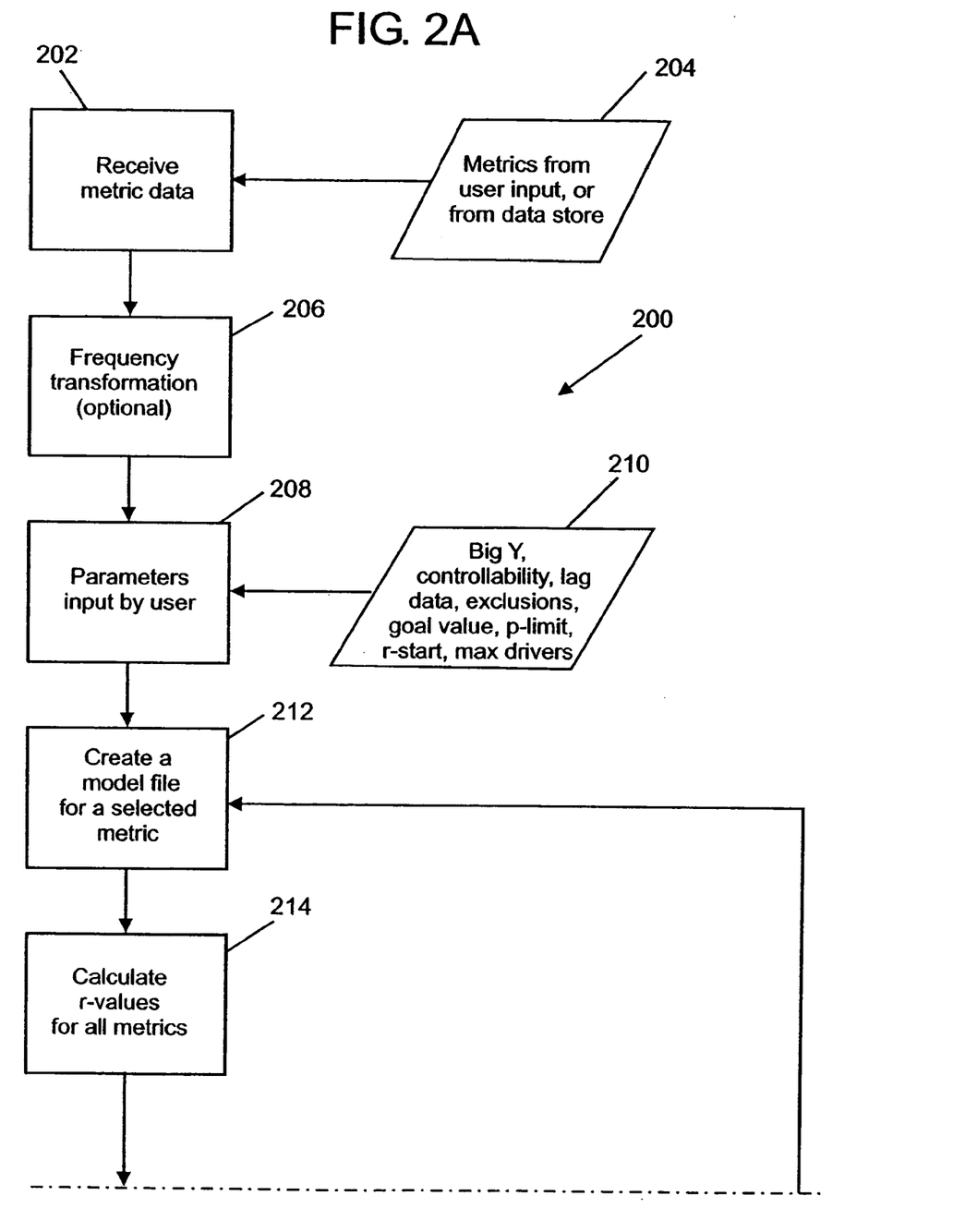

FIGS. 2A and 2B depict a flowchart illustrating one example of an overall process, 200, according to example embodiments of the invention. As is typically the case with flowcharts, FIGS. 2A and 2B present the method of the invention as a series of process blocks. At block 202, metric data for the plurality of interrelated metrics is received by the system. As shown by input 204, the metric data can be received via user input, or retrieved from a data store, database system, or data warehouse. In the case of at least some spreadsheet implementations, the data is manually entered via a spreadsheet input screen. In this example embodiment, the raw metric data must be normalized for a given frequency of measurement. For example, one cannot analyze daily, weekly, and monthly data without first converting daily data to weekly data and monthly data to weekly data, for example where a weekly analysis is desired. In the case of manual entry of the metric data, the user can perform this conversion prior to entering the data. In a more automated system where data is retrieved from a data warehouse, an execution platform implementing the invention may include frequency transformation routines as shown at block 206. The linking of a system implementing the invention to appropriate data stores and databases and the use of built-in frequency transformation techniques can enable an embodiment of the invention to deliver solutions on a continuous, real-time basis. In any case, the best frequency to use for calculations may in some cases be determined by a metric whose frequency cannot be changed. For example, customer satisfaction surveys might be gathered only on a weekly basis. If customer delight is the selected goal metric, then all other metrics should be broken down or summarized into weekly metrics so as to not lose resolution. In the case of a spreadsheet implementation, the user enters a field name for every one of the interrelated metric variables. The current values also need to be loaded.

At block 208, various parameters are input by the user, as shown by input block 210. The parameters typically control the manner in which some of the plurality of interrelated metrics are reflected in a summary which will eventually be generated by an embodiment of the invention. Note that the metric data and the parameters together make up the data that controls how the interrelated metrics and their relationships are eventually reflected in any summary report. The parameters, as shown at block 210, include the goal metric or the "big Y" for the current analysis. In some embodiments, the user has the option of listing exclusions, or certain variables which are to be omitted from the analysis. This capability can be valuable if a user later determines the data is erroneous. Since the metric data has been entered, it is a simple matter to run an analysis again without the exclusions. In some embodiments a user can input parameters regarding the controllability of various metrics. Thus, if there are metrics that cannot be changed, for example, budget constraints or the number of calls received at a call center, a user can cause them to be treated as variables that are not optimized, essentially constraints. Thus the analysis engine of the invention will not try to optimize these values, however the metrics will be reflected in any models or summaries created. A user can also enter a "lag period" at 210. Lag periods can be used by embodiments of the invention to analyze time lag effects. Units in relation to these parameters are specific to the data's frequency.

Additional parameters which can be input according to certain embodiments of the invention are a goal value for the selected goal metric, a "p-limit" for use in calculations, a starting value for a correlation coefficient, and a maximum number of selected driving metrics to be included in the analysis. The "p-value" is a probability associated with the risk of taking action because things appear different when they are in fact the same. This value establishes the threshold for what are significant factors as opposed to what are trivial factors in driving the selected goal metric. In statistical terms, the p-value for a given metric is the probability that its coefficient is zero, that it in fact has no effect on the goal metric or the metric above it. The "p-limit" is the p-value that must be reached before a specific metric is ignored in the analysis. A smaller p-limit increases the risk that an important metric will be ignored; a larger p-limit decreases that risk, but increases the number of selected driving metrics that will be included, and hence, the complexity of the models in the analysis.

The starting correlation coefficient or "r-start" indicates the amount of correlation ("r") that must be achieved for a given metric before it is included in the analysis. The correlation between variables establishes a threshold for sets of equations. Correlation in this context is used in the statistical sense as is understood in the statistical arts. Requiring a large correlation coefficient for a driving metric to be included in an analysis increases risk but also decreases the number of driving metrics included in the analysis and in an eventual summary report. The maximum number of driving metrics allows a user to limit the size of the analysis and the summary report to make it more convenient to work with. As will be seen below, the starting correlation coefficient is used in combination with the maximum number of drivers to allow a system implementing the invention to create a model and a summary which is of the desired size and complexity for a given user.

Returning to FIGS. 2A and 2B, after all the parameters and metric data are in the system, the analysis is initiated. In a spreadsheet implementation, this can be accomplished through the inclusion of an analysis button, as will be described below with respect to a description of an example user input screen. In blocks 212 through 234 of this example, the system attempts to create a model for each metric that is to be used. At block 212, a model file is created for a selected metric. Note that for each model, all of the other metrics are included as variables. At block 214, an r-value or correlation coefficient is calculated for each metric (variable) in the current model. At block 216, a determination is made as to whether of the r-values of variables that represent metrics in this model are less than the starting correlation coefficient, r-start. If so, those metrics or variables are removed at block 218, and processing returns to the determination at block 216. If not, a determination is made at block 220 as to whether the number of driving metrics in this model is greater than the maximum number which was set by the user when inputting the various parameters. If so, the starting r-value is increased by a specified amount at block 222. In this example embodiment, the value is increased by 0.05. Processing then returns to the decision at block 216. Thus, if there are more variables than the set limit, the r-value increases to exclude some variables or metrics. Once the number of drivers are equal to or below the maximum number at decision block 220, processing proceeds to regression analysis at block 224.

From the data input, an instruction execution system fits a regression line and creates an equation hierarchy that describes the relationship between all of the metric variables for the current model. At block 226 a check is made to determine if any of the variables have p-values that are greater than the set p-limit. If so, those metrics are removed and discarded at block 228. In such a case, the regression analysis at block 224 is repeated. When all metric variables have p-values that are less than or equal to the set limit, a model file for the selected metric, which includes an equation hierarchy for all of the drivers remaining, is saved at block 230. The equation hierarchy includes both coefficients and exponents for variables representing all of the metrics, which potentially drive the metric to which the current model file corresponds. At block 232, a check is made as to whether there are additional metrics which need to have corresponding model files created. If so, processing branches back to block 212 and the process is repeated for another selected metric. If not, processing proceeds to block 234, where a non-linear optimization is performed for each model file to optimize the equations for best fit.

At block 236 of FIG. 2B, the models are optimized. Optimization of the models can include a non-linear optimization, which is performed by changing exponents, constants, and coefficients to minimize a difference between a goal value and an estimated value for the selected goal metric. Further details of this non-linear optimization will be discussed later with respect to FIG. 5. Finally, in block 238 of FIG. 2B, the results of the optimizations for the various models are combined to produce a summary which describes the hierarchy of selected driving metrics for the selected goal metric. This summary is presented as a report which can be used to determine how to adjust certain drivers in order to achieve a goal value for the selected goal metric. Additional detail on how the summary report is produced will be discussed with respect to FIG. 6. In addition to producing the summary, all model files can be saved and stored for future use. Additional details for all of the process blocks of FIGS. 2A and 2B can also be garnered by examining the source code appendix.

Figure 3:
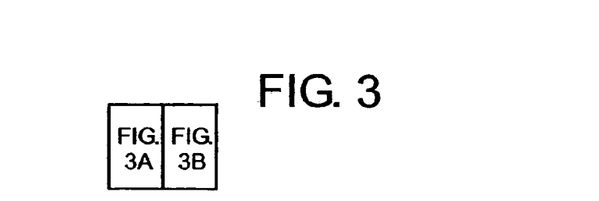
FIG. 3, shown as FIGS. 3A and 3B is a screen shot of a user input screen according to some example embodiments of the invention.
Figure 3A:
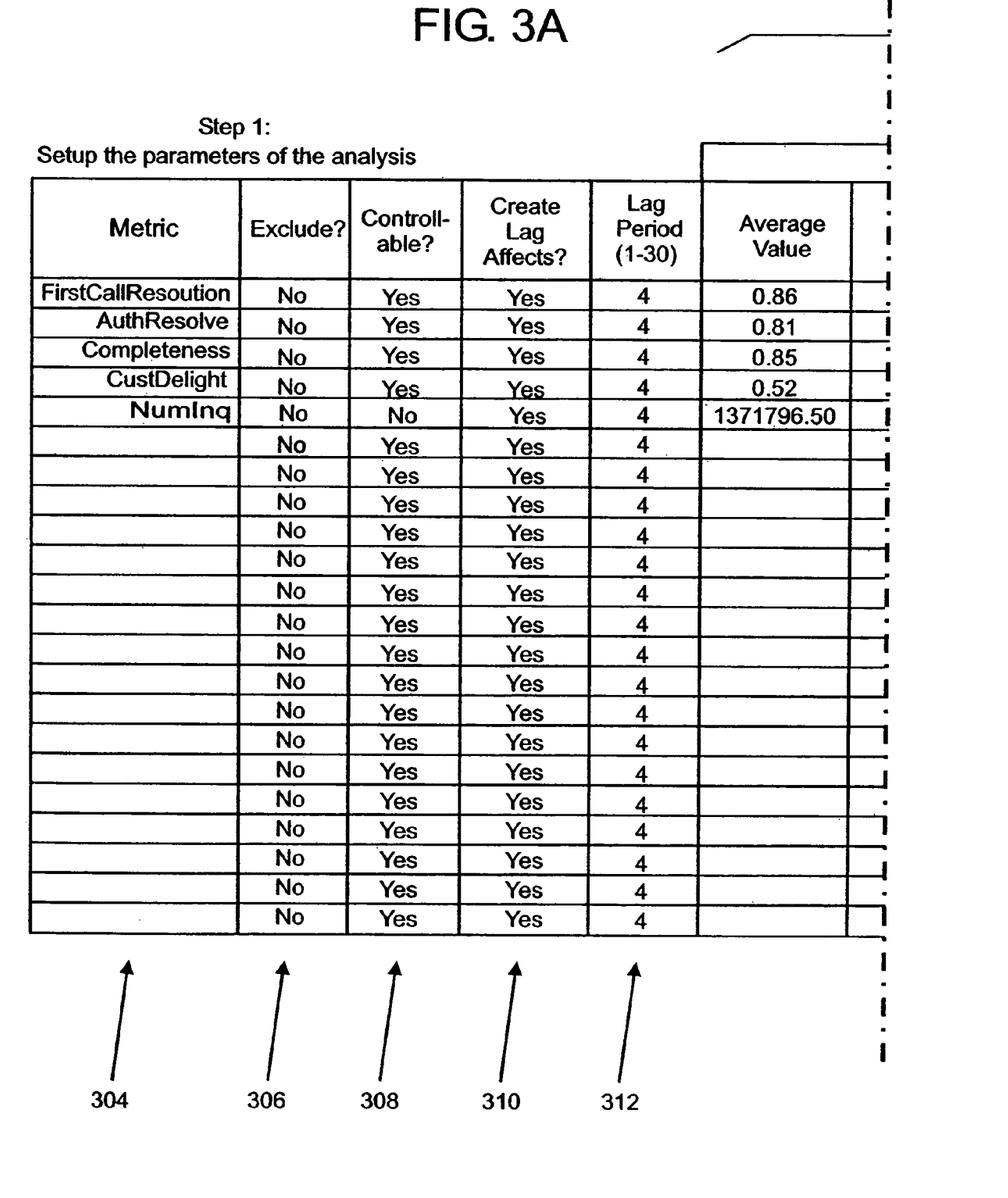
Figure 3B:
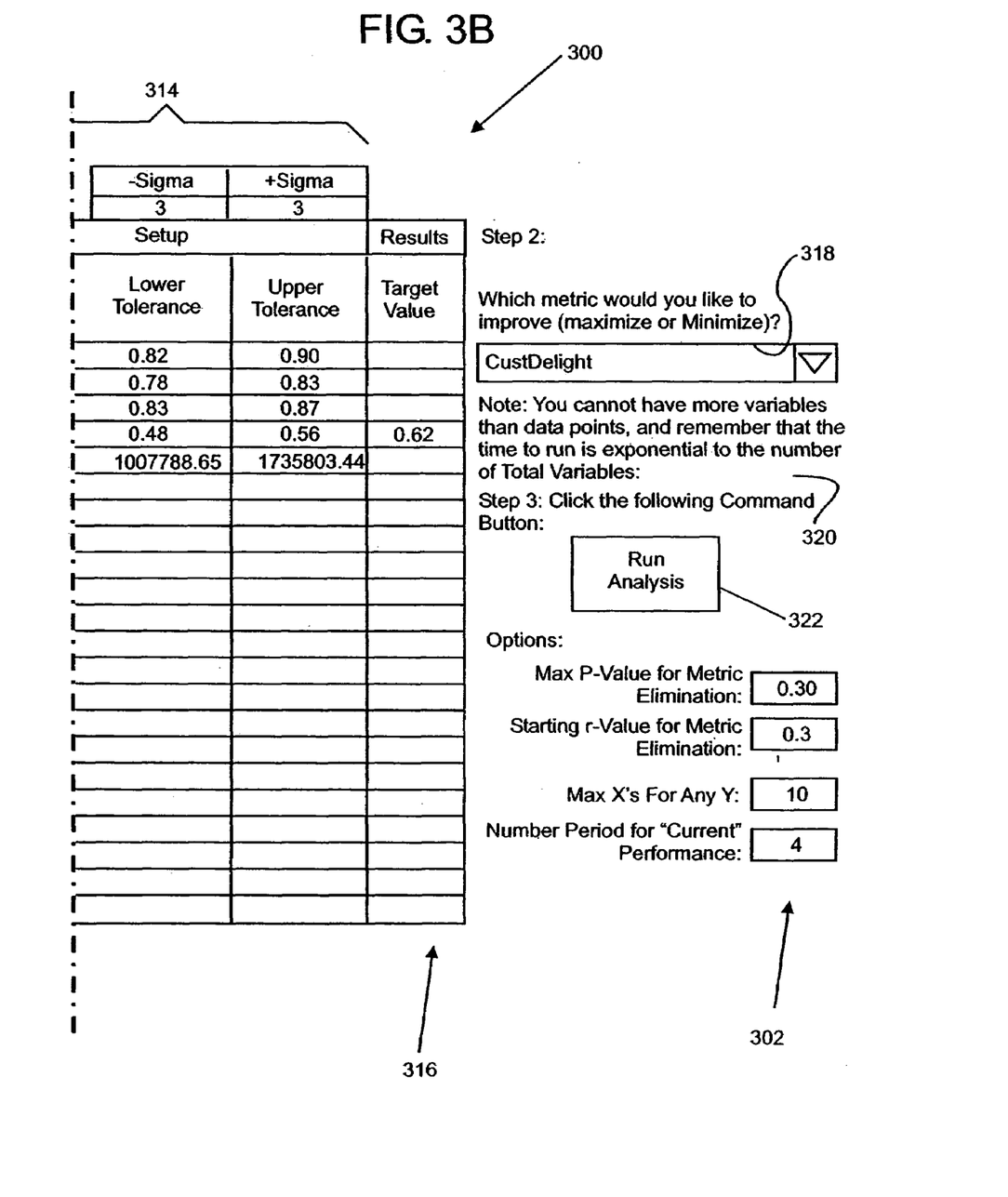

Before delving into the details of the optimizations performed by an embodiment of the invention, it may be helpful for the reader to see how the various input data is organized in a user input screen. FIGS. 3A and 3B illustrate an example user input screen operable to receive the various parameters for controlling the manner in which interrelated metrics are reflected in a summary report. In this particular example, input screen 300 also provides a vehicle to input metric data. The example input screen is illustrative of one that would be used in a spreadsheet implementation of the invention. A screen similar to this is generated by the Visual Basic source code in the appendix, except that the screen of FIGS. 3A and 3B have been simplified somewhat for clarity. Additionally, the screen of FIGS. 3A and 3B is shown only partially populated with data, again for clarity. Note that the screen indicates the various steps that a user would walk through in order to reach the point where an analysis can be run.

Optional parameters are input in fields 302. In this example, the optional parameters include the maximum p-value for the elimination of metric variables (the p-limit), the starting r-value or correlation coefficient for the elimination of metric variables (r-start), and the maximum number of driving metrics for the selected goal metric. In this example, these values are 0.30, 0.3, and 10, respectively. The number of periods to be analyzed for arriving at a current value for performance measurement is also an optional parameter and is set at 4.

The main part of user input screen 300 includes metric data, which in this example is entered by the user. Column 304 is where names are given to all of the interrelated metrics. In this example, the names are shortened versions of phrases which describe each metric. Specifically, the metrics already entered are for first call resolution, authority to resolve, completeness of answer or response, customer delight, and the number of inquiries received during a measurement cycle. In column 306 the user has an opportunity to exclude any one of the particular interrelated metrics. In column 308, a user can indicate whether or not a particular metric is controllable by managing the business process. For example, the number of inquiries received from customers is not controllable, so the user has indicated "No" for that metric. This indication will cause the contribution to any models from that metric to be reflected as a constant value. In column 310 a user indicates whether or not lag effects are to be created for the particular metric. Column 312 is where the user specifies the lag period in terms of number of measurement periods for each particular metric if lag effects are desired.

The setup area, 314, of the user input screen is where a user specifies the current average value for each metric, and the upper and lower tolerances for each metric. These tolerances establish limits for the optimized values for each metric, i.e. a reasonably attainable range of performance. These limits can either be set manually or calculated on a measure of statistical process capability. This area also provides fields for the user to enter values for −sigma (standard deviation) and +sigma for the statistically determined bounds. In column 316, the user indicates the target value for whichever is the selected goal metric for a particular analysis.

In drop-down box 318, the user indicates which metric will be used as the selected goal metric for the particular analysis about to be run. Note that the analysis could be run many times with a different selected goal metric each time, while using the same data. Such an exercise will create multiple summaries showing the hierarchy of selected driving metrics for each selected goal metric. These summaries can provide significant insights into how to optimize a particular business process. Field 320 specifies the total number of variables or metrics that will be included in the analysis. As indicated, the user can view this as an indication of the complexity of the analysis and the amount of time required for execution by a computing platform that is to perform the analysis. Button 322 is pushed or "clicked" when all the data has been entered and the user desires to run the appropriate analysis and generate a summary report.

Figure 4:
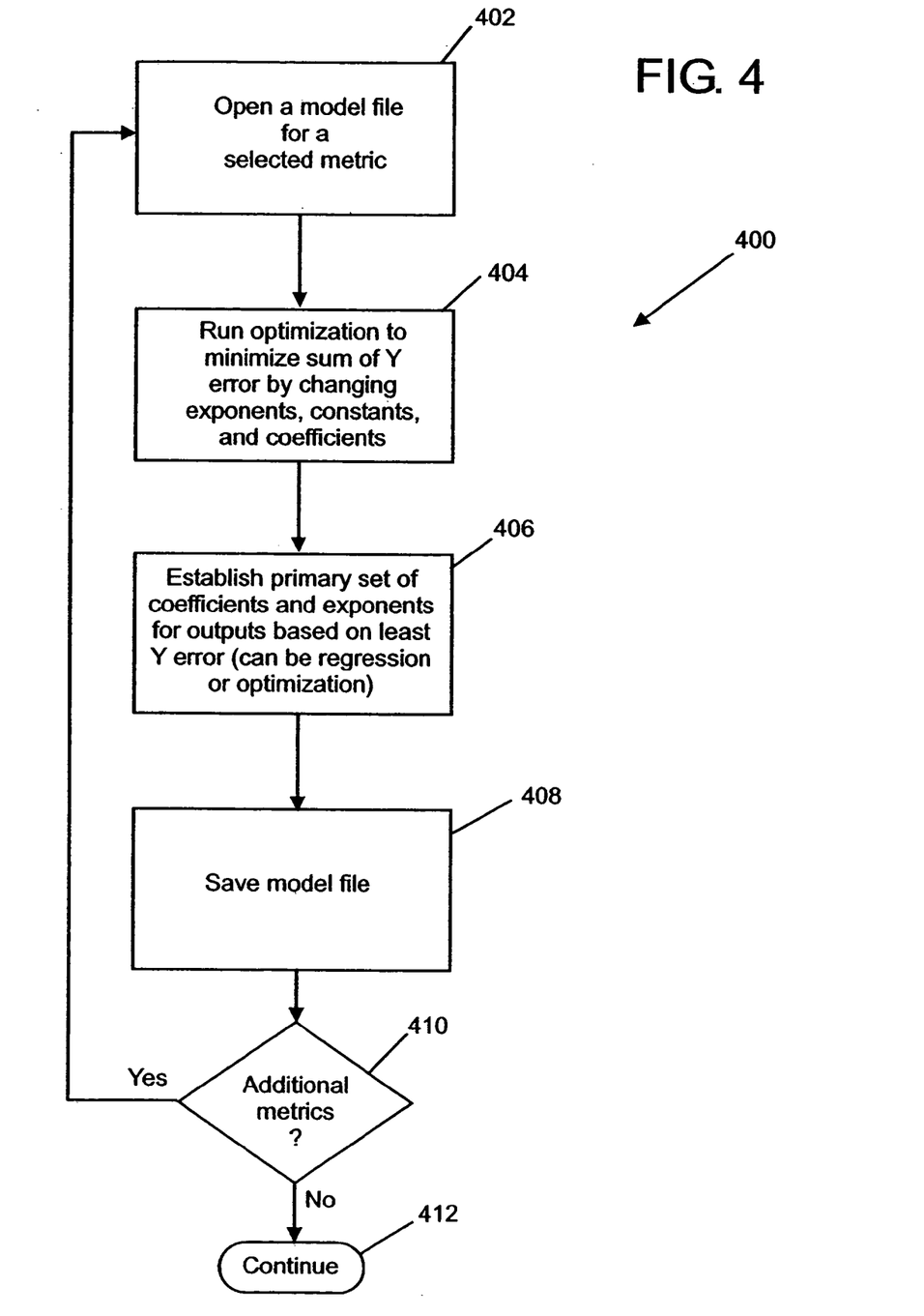
FIG. 4 is a flowchart illustrating additional detail of a method of carrying out the invention according to some embodiments.

FIG. 4 is a flowchart illustrating further detail of a process, 400, for non-linear optimization for best fit, performed as part of the creation of the models as referred to at block 234 of FIG. 2. In example embodiments of the invention, through the process of FIG. 4, an analysis engine improves each metric's model fit by introducing an exponent to each term in the equations. Thus, in example embodiments, the analysis is not limited to linear relationships. If a non-linear relationship makes for a better fit than a linear one, the analysis engine of the invention will use a non-linear equation. At block 402 a metric is selected and its model file is opened. At block 404 a non-linear optimization is run to minimize the sum of error in the selected goal metric by changing exponents, constants, and coefficients. This optimization uses non-linear programming techniques. Non-linear programming is a well-known technique that is used to solve problems that can be put into specific mathematical forms. Problems are solved by seeking to minimize a scalar function of several variables subject to other functions. In the present case, non-linear programming is used to minimize error in the selected goal metric. It should be noted that the term "programming" as used in the phrase "non-linear programming" refers to the planning of the necessary solution steps that is part of the process of solving a problem. This choice of terminology is incidental to the use of the terms "program" and "programming" in reference to programming instructions that are executed on a processing platform to perform certain tasks.

At block 406 of FIG. 4, a primary set of coefficients and exponents is established for outputs based on the least error in the "big Y" as determined from the non-linear optimization of block 404. Depending on the results of the non-linear optimization, the outputs can be based either on further non-linear optimization or regression. At block 408 the newly updated model file is saved. At block 410, a check is made as to whether there are additional model files for additional metrics which need to have the optimization of block 404 run. If yes, processing returns to block 402. If not, processing moves to block 412, which is to say it continues to the next step of the overall process.

Figure 5:
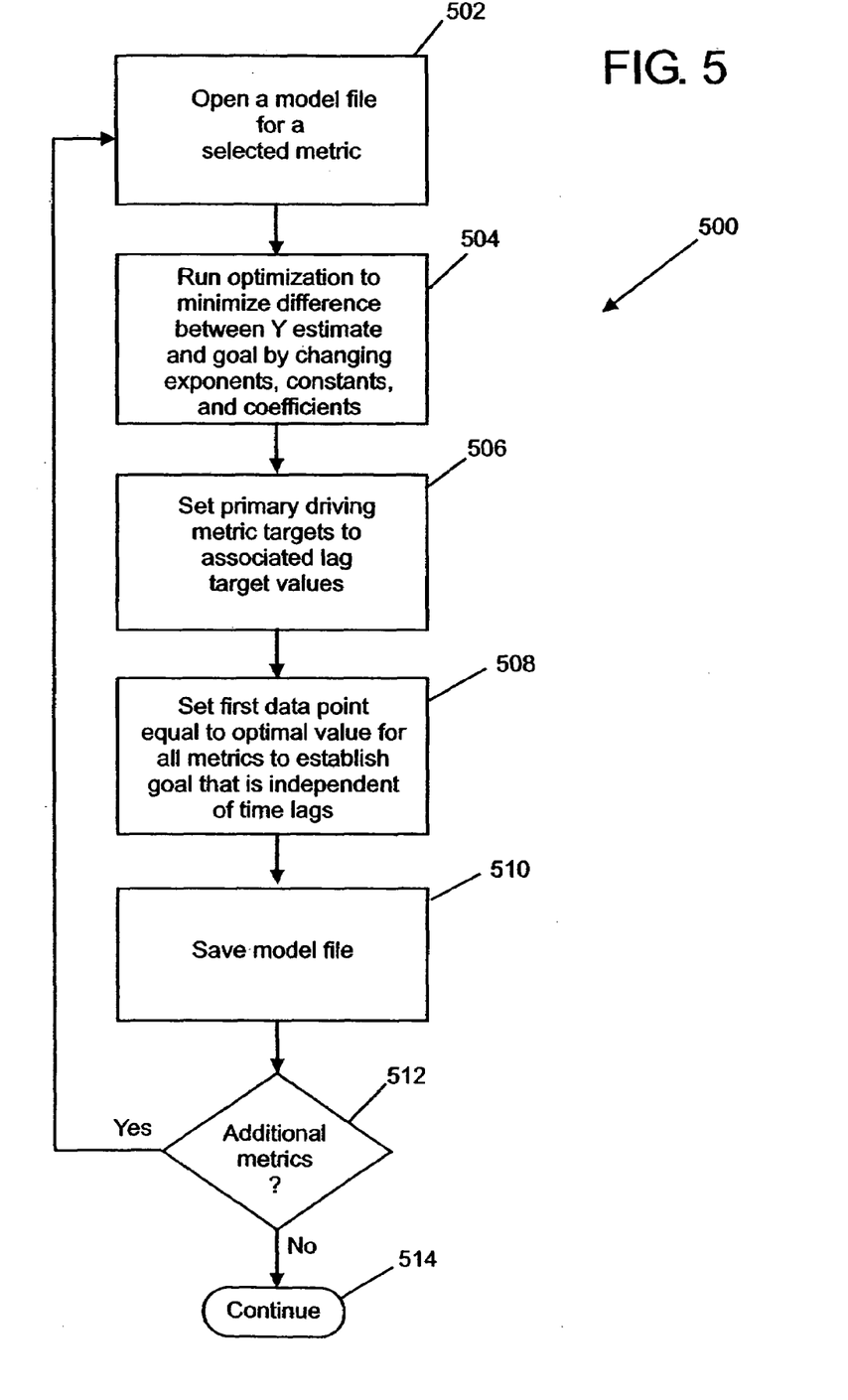
FIG. 5 is an additional flowchart illustrating some example detail of the method according to some embodiments of the invention.

FIG. 5 presents a flowchart that illustrates details of the process for determining optimal metric goals, 500, which is shown at block 236 of FIG. 2. The process of FIG. 5 performs a second non-linear optimization to meet goals. In the simplest case, the goal being optimized for is the selected goal metric. However, other constraints set by the user are treated as "goals" for purposes of this non-linear optimization. At block 502 a selected model file is open for a selected metric. At block 504, a second non-linear optimization is run to minimize the difference between an estimated selected goal metric, Y, and the desired value for the goal metric. Again, this non-linear optimization is performed by changing exponents, constants, and coefficients in order to minimize the difference. At block 506, the primary driving metric targets, that is those that are not constants and are not left out of the optimization, are set to lag target values to take into account time lag effects. The first data point for the model being processed is then set equal to a point corresponding to the optimal value for all of the metrics that drive the currently processed metric so that its goal is independent of time lags. At this point the analysis engine has determined a value for each driving metric for the currently processed or selected metric so that the response variable is as close as possible to its goal. The updated model file is saved at block 510. As before, a check is made at block 512 to see if there are additional metric model files to be processed. If yes, processing returns to block 502. If not, processing moves to block 514 and continues.

Figure 6:
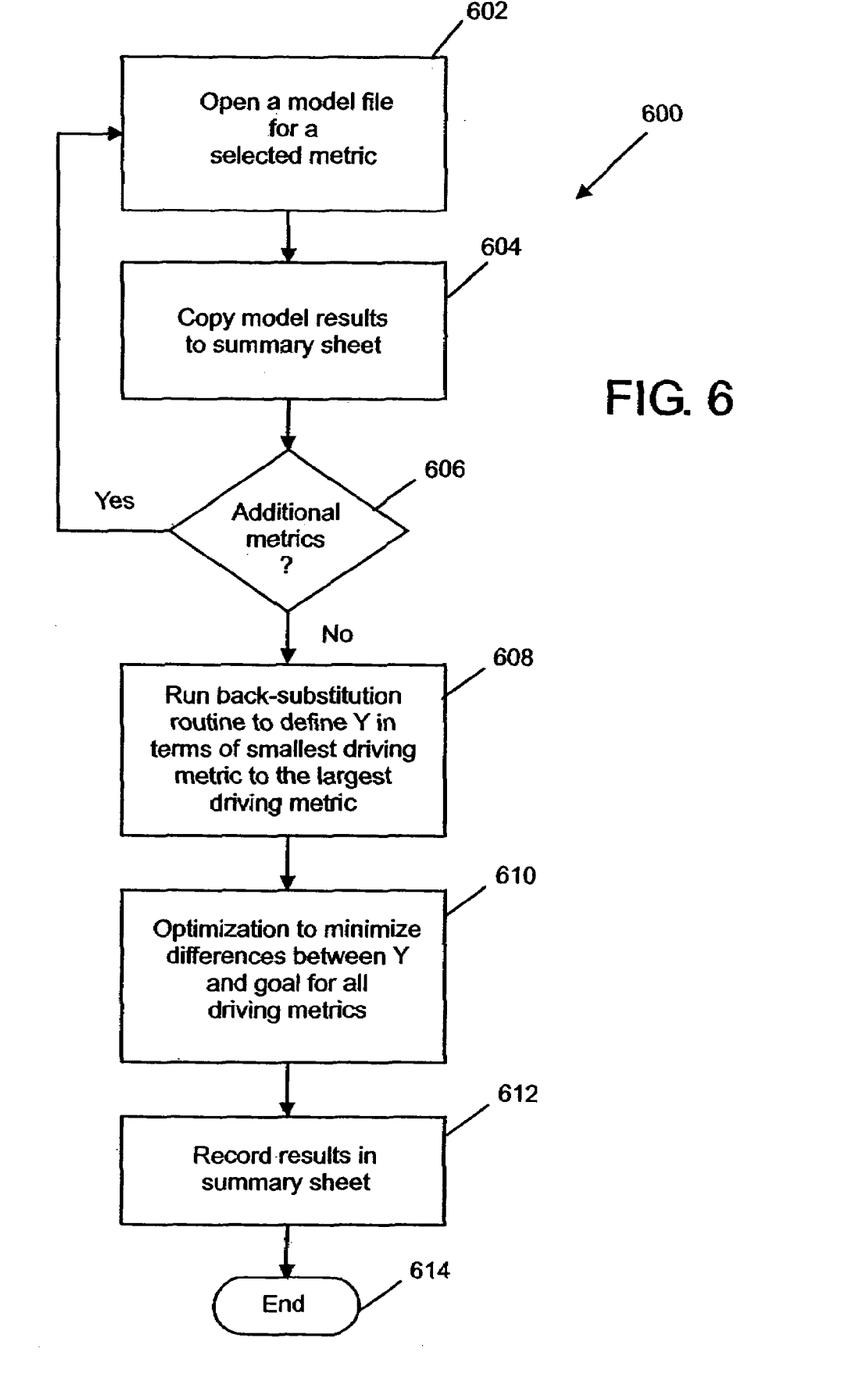
FIG. 6 is an additional flowchart illustrating detail according to at least some example embodiments of the invention.

FIG. 6 is a flowchart which illustrates details of a process, 600, for combining the results of the various models and producing a summary or summary report which describes a hierarchy of the selected driving metrics relative to the selected goal metric. The process of FIG. 6 makes use of a stored summary sheet or summary table which is eventually used to display a summary report. At block 602 a selected model file for a selected metric is opened and at block 604, the model results are copied to the summary sheet. At block 606 a determination is made as to whether additional results need to be copied into the summary sheet. If yes, processing returns to block 602 and the process is repeated. If no, meaning that model results for all of the selected driving metrics have been copied to the summary sheet, processing continues to block 608.

At block 608, the analysis engine of the invention, in example embodiments, runs a back substitution routine to define the selected goal metric, Y, in terms of the smallest to the largest driving metric. Previously, goals were established using a top down approach. Now, the analysis engine of the invention looks at the relationships from a bottom up approach, starting with the smallest variable. That is to say the optimal best values for each driving metric are placed into the lowest level equations. The dependent variables are then calculated and, in turn, placed into the next higher level of equations, and so on until the selected goal metric Y, is calculated. Generally this will yield a slight reduction in the optimal best value for the selected goal metric. At block 610, a further, third non-linear optimization is performed to meet the selected goal metric. This non-linear optimization is essentially the same as the second non-linear optimization discussed with respect to FIG. 5. However, the optimization, for the selected goal metric, is performed after the back substitution. Because the back substitution process defines the selected goal metric by beginning with the substantially smallest of the driving metrics and moves to the substantially largest of the driving metrics, this third non-linear optimization can determine the substantially best values for all of the driving metrics. At block 612, the final results of the process are recorded in a summary sheet or stored table which is then used to produce a summary report. This summary of the analysis is recorded as an XY map. A file can be stored for every metric in the analysis. Thus, a user can audit the model. Saving a file for every metric also allows a user to go back and review the analysis with different selected goal metrics, without having to wait for all the calculations to be repeated. The XY map summary analysis establishes a hierarchy of metrics, what the target value of each metric should be, and what the predictive equations are for each metric. Thus, a tool according to embodiments of the invention can be used to determine what the vital few driving metrics are for a current period of time for a specific goal.

Figure 7:
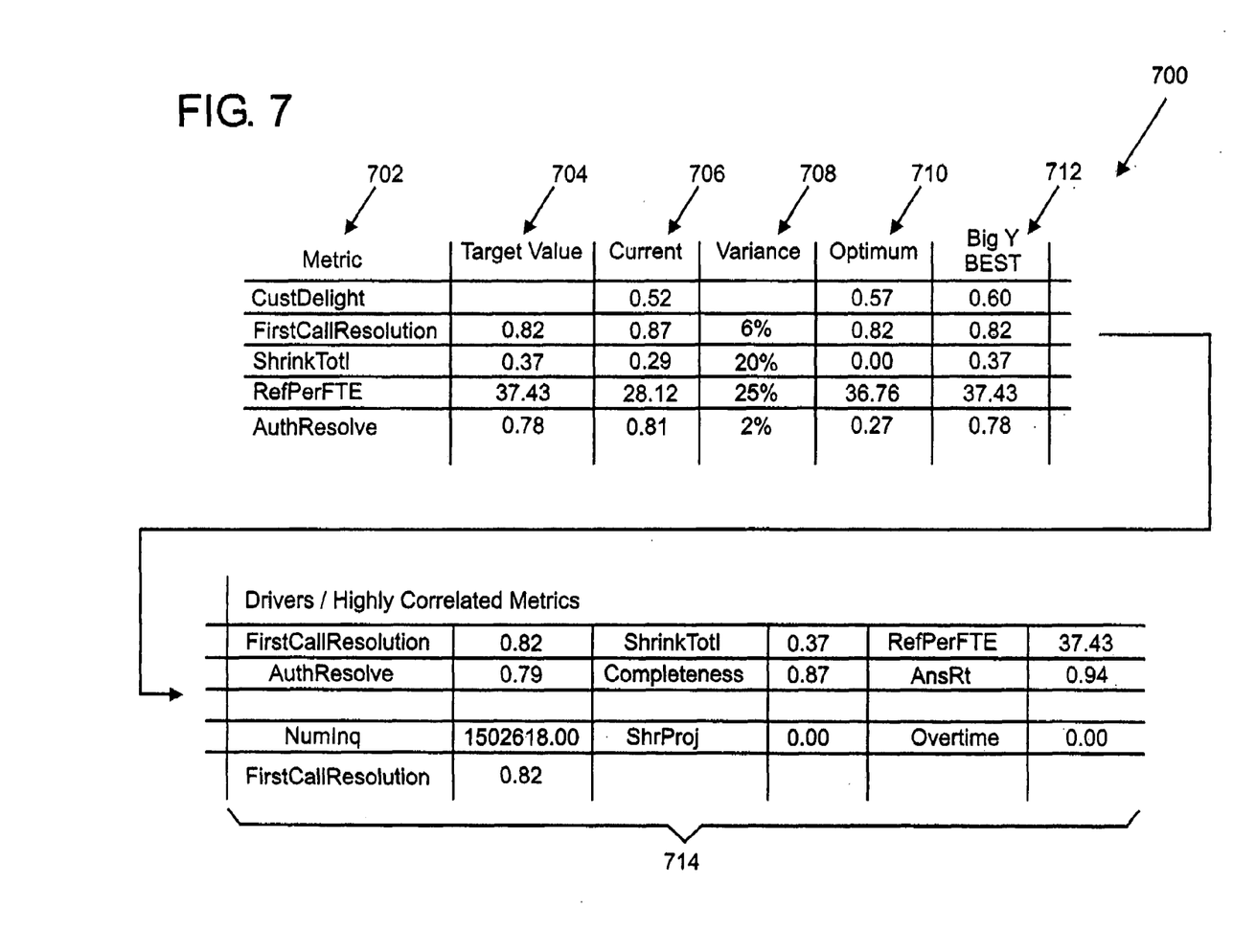
FIG. 7 is a portion an example summary report which describes a hierarchy of selected driving metrics for a selected goal metric, according to an example embodiment of the invention.

FIG. 7 illustrates a small portion of a summary report which might be generated through use of an embodiment of the invention. The summary report, 700, of FIG. 7 is presented in table format. In a spreadsheet implementation of the invention, such a summary report would be displayed in a worksheet. Column 702 of the summary report lists the metric by short name, as input by the user prior to the analysis. Column 704 lists the target value for each driving metric. In the present example, the selected goal metric is customer delight. Target values for the driving metrics are the values that the business should attempt to meet in order to maximize customer delight. Column 706 lists the current value for each metric. Column 708 of the summary report lists the variance of the current value from the target value. Thus, column 708 gives an indication of how much improvement is needed in each of the selected driving metrics in order to achieve the goal.

Column 710 lists the optimum achievable value for each metric in the current analysis. In effect, the optimum value is the best that can be achieved through the current business process. To achieve better performance than the optimum values listed in column 710, fundamentals of the process would have to change, which would necessitate a new analysis. Column 712 of FIG. 7 indicates the best achievable "big Y" or selected goal metric, along with the corresponding values for the selected driving metrics which achieve that best value.

Section 714 of the summary report illustrated in FIG. 7, in example embodiments, provides details of selected driving metrics further down in the hierarchy of relationships between metrics. For each selected driving metric listed to the left in column 702, highly correlated driving metrics for that metric are listed. For example, note that overtime and the shrinkage per project are highly correlated driving metrics for the metric of referrals per full time employee (Ref per FTE). The values listed in this section for each driver are the optimal values for that driver in order to drive the corresponding metric in column 702 to its target value.

Figure 8:
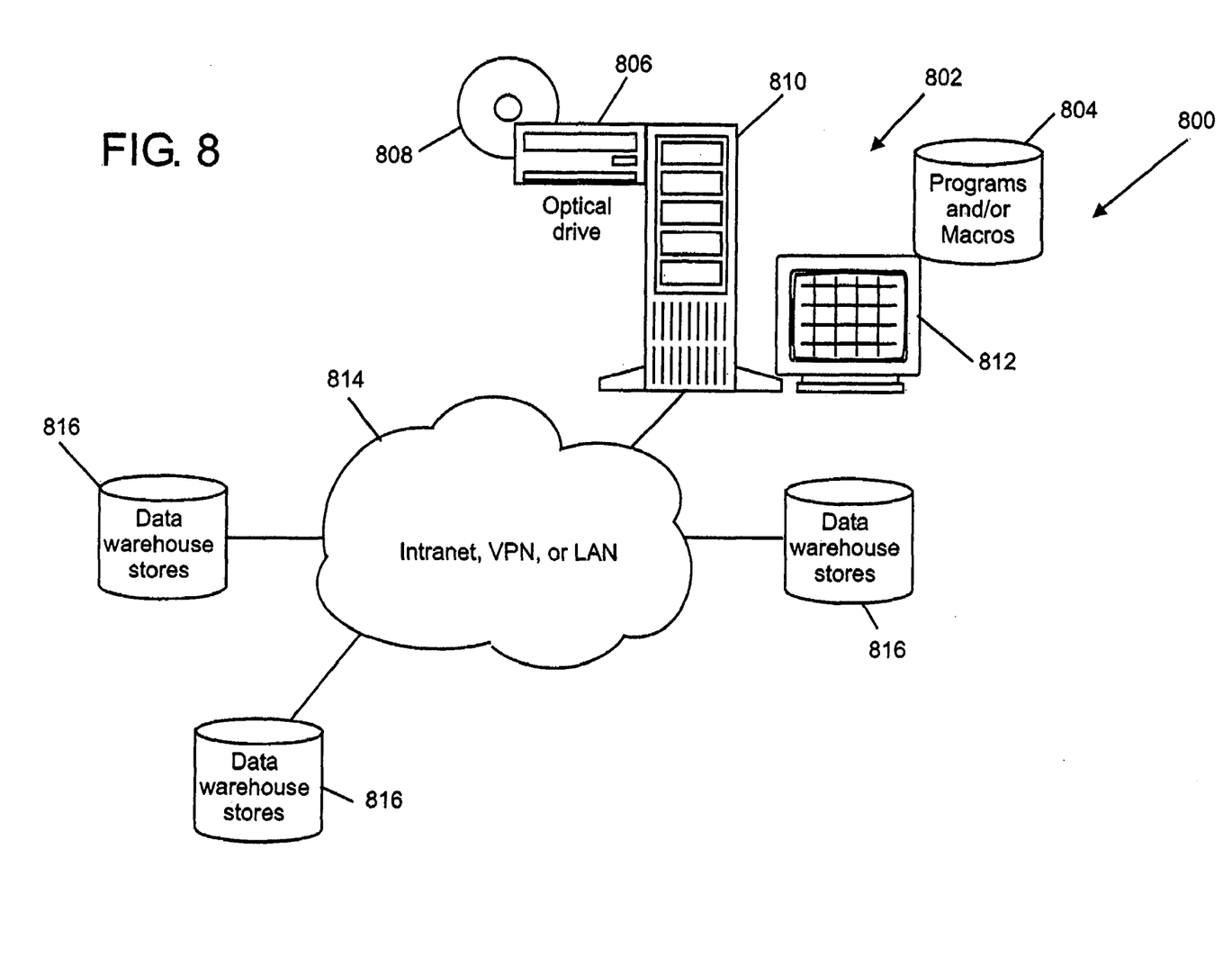
FIG. 8 is a network block diagram which illustrates an example operating environment for the invention.

FIG. 8 illustrates a typical operating environment for embodiments of the present invention. FIG. 8 actually illustrates two alternative embodiments of a system implementing the invention. Computer system 802 can be a workstation or personal computer. System 802 can be operated in a "stand-alone" mode, in which a user enters all data including parameters and data pertaining to the interrelated metrics. The system includes a fixed storage medium, illustrated graphically at 804, for storing programs and/or macros which enable the use of an embodiment of the invention. In a spreadsheet implementation of the invention, these include the spreadsheet program and any macros or plug-ins, which are necessary to customize the spreadsheet program to implement an embodiment of the invention. Otherwise, these can include application programs or an application program which implements the invention. In this particular example, an optical drive, 806, is connected to the computing platform for loading the appropriate computer program product into system 802 from an optical disk, 808. The computer program product includes a computer program or programs with instructions for carrying out the methods of the invention.

Processing platform 810 can execute the appropriate instructions and display appropriate screens on display device 812. These screens can include a user input screen which is operable to receive parameters for controlling the manner in which some of the plurality of interrelated metrics are reflected in any summary reports or stored models. Files, tables, or sheets can be stored on storage medium 804, or written out to an optical disk, such as optical disk 808. In at least some spreadsheet implementations of the invention, display device 812 displays a grid which is commonly thought of as a "spreadsheet" and is illustrated in FIG. 8 as an example.

FIG. 8 also illustrates another embodiment of the invention in which case the system 800 which is implementing the invention includes a connection to a data warehouse, the connection being operable to receive at least some of the data pertaining to the interrelated metrics. This data can then be used by processing platform 810 without the user having to enter all the data. Certain parameters, which control the analysis, can still be entered by the user through display device 812. Likewise, programs or macros which implement the invention, including a custom designed application, can be stored on storage medium 804, and transported on optical disk 808. The connection to the data warehouse or appropriate databases can be formed in part by network 814, which can be an intranet, virtual private network (VPN) connection, local area network (LAN) connection, or any other type of network resources, including the Internet. Data needed to run the appropriate analysis can be maintained in one or more data stores or databases, 816, which may be part of a data warehouse. Updates can be made in batch transactions or individual updates can be made every time a change occurs throughout any of the data stores. Alternatively, an application program running on system 802 can request updates as needed. Any of the normal methods which are known in the art may be used to make these updates and provide the connectivity between the data warehouse stores and any applications running on system 802.

In any case, a computer program which implements all or parts of the invention through the use of systems like those illustrated in FIG. 8 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

The appendix to this application includes Visual Basic source code for a collection of macros which work with the well-known Microsoft Excel spreadsheet program. The source code can be used by one of skill in the art to cause a computer system implementing Microsoft Excel to carry out the methods and processes of an example embodiment of the invention. The text file contains source code for four macros all listed one after the other, however; each one is delineated by appropriate text headings. The macros consist of control panel code which implements a user input screen, a main program which contains common routines which are used throughout the various stages of executing an embodiment of the invention, and two macros which make use of the standard solver tools which are included within at least the "XP" versions of Microsoft Excel. One of the macros includes solver fitting code, and the other includes solver target code. The macros can be used to produce a Microsoft Excel spreadsheet and appropriate Excel add-ins. It cannot be over-emphasized that the exact implementation implicated by the appendix to this application is but an example. One of ordinary skill in the art can easily adapt the principles learned from studying the source code to other systems, dedicated applications, and even other computing platforms which do not make use of Microsoft Excel or any other spreadsheet program.

Specific embodiments of an invention are described herein. One of ordinary skill in the computing and statistical arts will recognize that the invention can be applied in other environments and in other ways. It should also be understood that not all of the elements and features in the drawings, or even in any one drawing are necessary to implement the invention as contemplated by any of the appended claims. Likewise, an implementation of the invention can include features and elements or steps in addition to those described and claimed herein. Also, the steps in the appended claims are not necessarily conducted in the order recited, and in fact, can be conducted in parallel in some cases. Thus, the following claims are not intended to limit the scope of the invention to the specific embodiments described herein.

The invention claimed is:

1. A method of modeling a business process to facilitate an evaluation of driving metrics for a selected goal metric, the method comprising:
    gathering data to define a plurality of interrelated metrics associated with the business process;
    creating a plurality of models based on the data, each of the plurality of models corresponding to one of the plurality of interrelated metrics;
    performing a non-linear optimization for each of the plurality of models to adjust the primary coefficients and exponents to minimize the difference between an estimated value and a goal value for the selected goal metric; and
    running a back-substitution routine to define the selected goal metric in terms of the substantially smallest to the substantially largest of the selected driving metrics to combine the results of the non-linear optimization for each of the plurality of models to produce a summary which describes a hierarchy of selected driving metrics for the selected goal metric.

2. The method of claim 1 further comprising setting values for at least some of the interrelated metrics to associated lag target values so that the summary reflects time lag effects.

3. The method of claim 2 wherein the creating of the plurality of models further comprises:
    setting a correlation coefficient starting value to limit the number of selected driving metrics to a preselected maximum number; and
    omitting from the creating of the plurality of models the interrelated metrics having a correlation coefficient that is less than a preselected starting value.

4. The method of claim 2 wherein the creating of the plurality of models further comprises setting at least some of the interrelated metrics corresponding to the plurality of models to a constant value to represent a metric that substantially cannot be controlled within the business process.

5. The method of claim 1 wherein the creating of the plurality of models further comprises:
    setting a correlation coefficient starting value to limit the number of selected driving metrics to a preselected maximum number; and
    omitting from the creating of the plurality of models the interrelated metrics having a correlation coefficient that is less than a preselected starting value.

6. The method of claim 5 wherein the creating of the plurality of models further comprises setting at least some of the interrelated metrics corresponding to the plurality of models to a constant value to represent a metric that substantially cannot be controlled within the business process.

7. The method of claim 1 wherein the creating of the plurality of models further comprises setting at least some of the interrelated metrics corresponding to the plurality of models to a constant value to represent a metric that substantially cannot be controlled within the business process.

8. A computer readable storage medium comprising a computer program for modeling a business process to facilitate an evaluation of driving metrics for a selected goal metric, the computer program further comprising:
    instructions for gathering data to define a plurality of interrelated metrics associated with the business process;
    instructions for creating a plurality of models based on the data, each of the plurality of models corresponding to one of the plurality of interrelated metrics;
    instructions for performing a non-linear optimization for each of the plurality of models to adjust the primary coefficients and exponents to minimize the difference between an estimated value and a goal value for the selected goal metric; and
    instructions for running a back-substitution routine to define the selected goal metric in terms of the substantially smallest to the substantially largest of the selected driving metrics to combine the results of the non-linear optimization for each of the plurality of models to produce a summary which describes a hierarchy of selected driving metrics for the selected goal metric.

9. The computer readable storage medium of claim 8 wherein the computer program further comprises instructions for setting values for at least some of the interrelated metrics corresponding to the plurality of models to associated lag target values so that the summary reflects time lag effects.

10. The computer readable storage medium of claim 9 wherein the instructions for creating a plurality of models further comprise:
- instructions for setting a correlation coefficient starting value to limit the number of selected driving metrics to a preselected maximum number; and
- instructions for omitting from the creating of the plurality of models the interrelated metrics having a correlation coefficient that is less than a preselected starting value.

11. The computer readable storage medium of claim 8 wherein the instructions for creating a plurality of models further comprise:
- instructions for setting a correlation coefficient starting value to limit the number of selected driving metrics to a preselected maximum number; and
- instructions for omitting from the creating of the plurality of models the interrelated metrics having a correlation coefficient that is less than a preselected starting value.

12. The computer readable storage medium of claim 11 wherein the instructions for creating of the plurality of models further comprise instructions for setting at least some of the interrelated metrics corresponding to the plurality of models to a constant value to represent a metric that substantially cannot be controlled within the business process.

13. The computer readable storage medium of claim 8 wherein the instructions for creating of the plurality of models further comprise instructions for setting at least some of the interrelated metrics corresponding to the plurality of models to a constant value to represent a metric that substantially cannot be controlled within the business process.

14. The computer readable storage medium of claim 9 wherein the instructions for creating of the plurality of models further comprise instructions for setting at least some of the interrelated metrics corresponding to the plurality of models to a constant value to represent a metric that substantially cannot be controlled within the business process.

15. Apparatus including a processor to facilitate an evaluation of driving metrics for a selected goal metric, the apparatus comprising:
- means for gathering data to define a plurality of interrelated metrics associated with the business process;
- means for creating a plurality of models based on the data, each of the plurality of models corresponding to one of the plurality of interrelated metrics;
- means for performing a non-linear optimization for each of the plurality of models to adjust the primary coefficients and exponents to minimize the difference between an estimated value and a goal value for the selected goal metric; and
- means for running a back-substitution routine to define the selected goal metric in terms of the substantially smallest to the substantially largest of the selected driving metrics to combine the results of the non-linear optimization for each of the plurality of models to produce a summary which describes a hierarchy of selected driving metrics for the selected goal metric.

16. The apparatus of claim 15 wherein the means for gathering data further comprises a user input screen operable to receive as input, parameters for controlling the manner in which some of the plurality of interrelated metrics are reflected in the summary.

17. The apparatus of claim 16 wherein the input screen is further operable to receive as input, a list of the interrelated metrics and their average values.

18. The apparatus of claim 16 wherein the means for gathering data further comprises a connection to a data warehouse.

19. The apparatus of claim 15 wherein the means for gathering data further comprises a connection to a data warehouse.

20. A system for modeling a business process to facilitate an evaluation of driving metrics for a selected goal metric, the system comprising:
- a user input screen to receive as input, data to define a plurality of interrelated metrics associated with the business process, and parameters for controlling the manner in which some of the plurality of interrelated metrics are reflected in a summary describing a hierarchy of selected driving metrics for the selected goal metric; and
- a processing platform including a computer readable medium whose contents cause the processing platform to create a plurality of models corresponding to the plurality of interrelated metrics, to perform a non-linear optimization for each of the plurality of models to adjust primary coefficients and exponents to minimize the difference between an estimated value and a goal value for the selected goal metric, and to run a back-substitution routine to define the selected goal metric in terms of the substantially smallest to the substantially largest of the selected driving metrics to produce a summary which describes a hierarchy of selected driving metrics for the selected goal metric.

21. The system of claim 20 further comprising a connection to a data warehouse operable to receive the data pertaining to the interrelated metrics for use by the processing platform.

22. The system of claim 21 wherein the parameters further comprise a maximum number of metrics to be included in the selected driving metrics and wherein the processing platform makes use of a correlation coefficient to limit the selected driving metrics to the maximum number.

23. The system of claim 20 wherein the parameters further comprise time lag information.

24. The system of claim 23 wherein the parameters further comprise a maximum number of metrics to be included in the selected driving metrics and wherein the processing platform makes use of a correlation coefficient to limit the selected driving metrics to the maximum number.

25. The system of claim 20 wherein the parameters further comprise indications of the controllability of at least some metrics.

26. The system of claim 25 wherein the parameters further comprise a maximum number of metrics to be included in the selected driving metrics and wherein the processing platform makes use of a correlation coefficient to limit the selected driving metrics to the maximum number.

27. The system of claim 20 wherein the parameters further comprise a maximum number of metrics to be included in the selected driving metrics and wherein the processing platform makes use of a correlation coefficient to limit the selected driving metrics to the maximum number.

* * * * *